(12) United States Patent
Oowatari

(10) Patent No.: US 11,794,300 B2
(45) Date of Patent: Oct. 24, 2023

(54) WORKPIECE TRANSFER SYSTEM

(71) Applicant: FANUC CORPORATION, Yamanashi (JP)

(72) Inventor: Hiroshi Oowatari, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 618 days.

(21) Appl. No.: 17/034,282

(22) Filed: Sep. 28, 2020

(65) Prior Publication Data

US 2021/0101242 A1    Apr. 8, 2021

(30) Foreign Application Priority Data

Oct. 4, 2019  (JP) .................... 2019-183878

(51) Int. Cl.
*B23Q 15/22* (2006.01)
*B23Q 7/04* (2006.01)
*B23Q 17/22* (2006.01)
*B25J 13/08* (2006.01)
*B25J 9/06* (2006.01)
*B25J 9/16* (2006.01)

(52) U.S. Cl.
CPC ........... *B23Q 15/225* (2013.01); *B23Q 7/046* (2013.01); *B23Q 17/22* (2013.01); *B23Q 2717/00* (2013.01); *B25J 9/163* (2013.01); *B25J 13/088* (2013.01)

(58) Field of Classification Search
None
See application file for complete search history.

(56) References Cited

U.S. PATENT DOCUMENTS

2018/0089589 A1*  3/2018  Ooba ............... G05B 19/4182
2019/0314989 A1* 10/2019  Sokabe .............. B25J 9/1664

FOREIGN PATENT DOCUMENTS

| JP | 6-126668 | 5/1994 |
| JP | 2007-30087 | 2/2007 |
| JP | 2017-94438 | 6/2017 |
| JP | 2019-48365 | 3/2019 |

* cited by examiner

*Primary Examiner* — Ryan A Jarrett
(74) *Attorney, Agent, or Firm* — Wenderoth, Lind & Ponack, L.L.P.

(57) ABSTRACT

To change or update each operating pattern and/or an operating condition according to a workpiece feeding state and/or an operating state of a robot. A workpiece transfer system includes: a workpiece infeed device for feeding a workpiece; a robot for transferring the workpiece being fed; a control device for selecting an operating condition of the robot based on a condition related to the workpiece and/or a condition related to the robot, the control device including a storage unit in which plural operating conditions are stored and a selection unit for selecting, as the operating condition of the robot, an optimum operating condition out of the plural operating conditions.

16 Claims, 11 Drawing Sheets

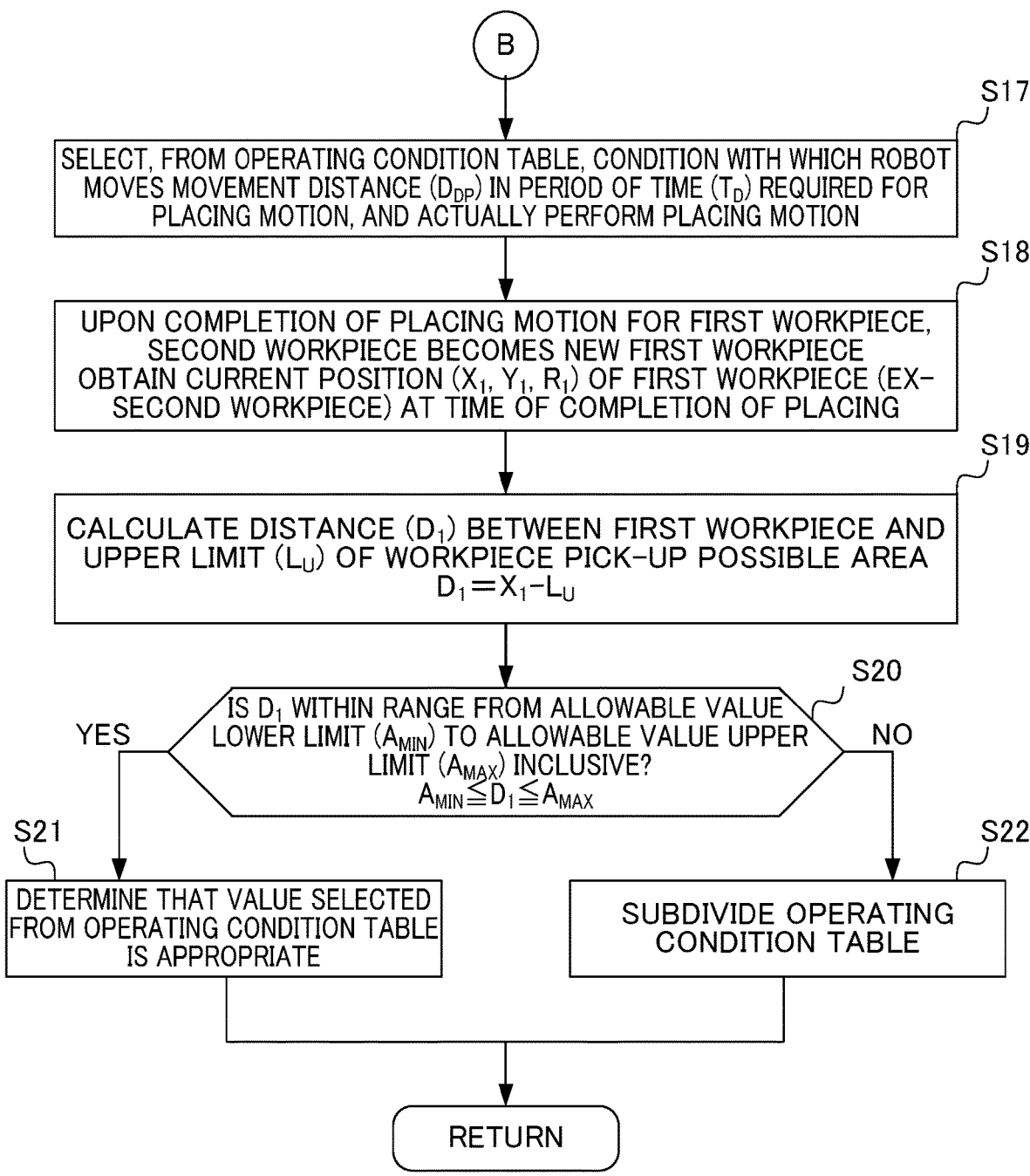

FIG. 6A

| TIME \ DISTANCE | $D_P \leq 100$ | $100 < D_P \leq 140$ | $140 < D_P \leq 180$ | $180 < D_P \leq 220$ | $220 < D_P \leq 260$ | $260 < D_P$ |
|---|---|---|---|---|---|---|
| $T_1 \leq 0.20$ | 2500mm/sec | 3000mm/sec | 3500mm/sec | 4000mm/sec | 4000mm/sec | 4000mm/sec |
| $0.20 < T_1 \leq 0.25$ | 2000mm/sec | 2500mm/sec | 3000mm/sec | 3500mm/sec | 4000mm/sec | 4000mm/sec |
| $0.25 < T_1 \leq 0.30$ | 1500mm/sec | 2000mm/sec | 2500mm/sec | 3000mm/sec | 3500mm/sec | 4000mm/sec |
| $0.30 < T_1 \leq 0.35$ | 1000mm/sec | 1500mm/sec | 2000mm/sec | 2500mm/sec | 3000mm/sec | 3500mm/sec |
| $0.35 < T_1 \leq 0.40$ | 900mm/sec | 1000mm/sec | 1500mm/sec | 2000mm/sec | 2500mm/sec | 3000mm/sec |
| $0.40 < T_1 \leq 0.45$ | 800mm/sec | 900mm/sec | 1000mm/sec | 1500mm/sec | 2000mm/sec | 2500mm/sec |
| $0.45 < T_1 \leq 0.50$ | 700mm/sec | 800mm/sec | 900mm/sec | 1000mm/sec | 1500mm/sec | 2000mm/sec |
| $0.50 < T_1 \leq 0.55$ | 600mm/sec | 700mm/sec | 800mm/sec | 900mm/sec | 1000mm/sec | 1500mm/sec |
| $0.55 < T_1 \leq 0.60$ | 500mm/sec | 600mm/sec | 700mm/sec | 800mm/sec | 900mm/sec | 1000mm/sec |
| $0.60 < T_1 \leq 0.65$ | 400mm/sec | 500mm/sec | 600mm/sec | 700mm/sec | 800mm/sec | 900mm/sec |
| $0.65 < T_1 \leq 0.70$ | 300mm/sec | 400mm/sec | 500mm/sec | 600mm/sec | 700mm/sec | 800mm/sec |
| $0.70 < T_1$ | 200mm/sec | 300mm/sec | 400mm/sec | 500mm/sec | 600mm/sec | 700mm/sec |

FIG. 6B

| TIME \ DISTANCE | $D_P \leq 100$ | $100 < D_P \leq 140$ | $140 < D_P \leq 180$ | $180 < D_P \leq 200$ | $200 < D_P \leq 220$ | $220 < D_P \leq 260$ | $260 < D_P$ |
|---|---|---|---|---|---|---|---|
| $T_P \leq 0.20$ | 2500mm/sec | 3000mm/sec | 3500mm/sec | 3750mm/sec | 4000mm/sec | 4000mm/sec | 4000mm/sec |
| $0.20 < T_P \leq 0.25$ | 2000mm/sec | 2500mm/sec | 3000mm/sec | 3250mm/sec | 3500mm/sec | 4000mm/sec | 4000mm/sec |
| $0.25 < T_P \leq 0.30$ | 1500mm/sec | 2000mm/sec | 2500mm/sec | 2750mm/sec | 3000mm/sec | 3500mm/sec | 4000mm/sec |
| $0.30 < T_P \leq 0.35$ | 1000mm/sec | 1500mm/sec | 2000mm/sec | 2250mm/sec | 2500mm/sec | 3000mm/sec | 3500mm/sec |
| $0.35 < T_P \leq 0.40$ | 900mm/sec | 1000mm/sec | 1500mm/sec | 1750mm/sec | 2000mm/sec | 2500mm/sec | 3000mm/sec |
| $0.40 < T_P \leq 0.45$ | 800mm/sec | 900mm/sec | 1000mm/sec | 1250mm/sec | 1500mm/sec | 2000mm/sec | 2500mm/sec |
| $0.45 < T_P \leq 0.50$ | 700mm/sec | 800mm/sec | 900mm/sec | 950mm/sec | 1000mm/sec | 1500mm/sec | 2000mm/sec |
| $0.50 < T_P \leq 0.55$ | 600mm/sec | 700mm/sec | 800mm/sec | 850mm/sec | 900mm/sec | 1000mm/sec | 1500mm/sec |
| $0.55 < T_P \leq 0.60$ | 500mm/sec | 600mm/sec | 700mm/sec | 750mm/sec | 800mm/sec | 900mm/sec | 1000mm/sec |
| $0.60 < T_P \leq 0.65$ | 400mm/sec | 500mm/sec | 600mm/sec | 650mm/sec | 700mm/sec | 800mm/sec | 900mm/sec |
| $0.65 < T_P \leq 0.70$ | 300mm/sec | 400mm/sec | 500mm/sec | 550mm/sec | 600mm/sec | 700mm/sec | 800mm/sec |
| $0.70 < T_P$ | 200mm/sec | 300mm/sec | 400mm/sec | 450mm/sec | 500mm/sec | 600mm/sec | 700mm/sec |

WORKPIECE TRANSFER SYSTEM

BACKGROUND OF THE INVENTION

This application is based on and claims the benefit of priority from Japanese Patent. Application No. 2019-183878, filed on 4 Oct. 2019, the content of which is incorporated herein by reference.

BACKGROUND OF THE INVENTION

Field of the Invention

The present invention relates to a workpiece transfer system.

Related Art

In a case where a workpiece feeding amount in a workpiece transfer system including a robot for picking up a workpiece may become higher or lower, the operating condition of the robot is adjusted according to the highest workpiece feeding amount.

However, if the workpiece feeding amount is low, the processing performance of the robot becomes excessive relative to the workpiece feeding amount. Accordingly, the robot finishes the job early, and accordingly enters and stays in a standby state until a next workpiece is fed. In order to enter the standby state, the robot needs to decelerate, and in order to exit the standby state, the robot accelerates. The occurrence of the extra acceleration/deceleration leads to wasteful consumption of electric power and causes unnecessary wear to a speed reducer. Increasing the operating speed of the robot to a degree that is more than necessary also leads to wasteful consumption of electric power and causes unnecessary wear to the speed reducer.

In order to deal with this, a known robot palletizer is configured to calculate a processing period of time per workpiece, to calculate various speeds such as an acceleration speed, a fixed speed, and a deceleration speed according to an operating pattern corresponding to the processing period of time, and to operate the robot (e.g., see Japanese Unexamined Patent Application, Publication No. H06-126668).

Patent Document 1: Japanese Unexamined Patent Application, Publication No. H06-126668

SUMMARY OF THE INVENTION

However, according to the technique disclosed in Japanese Unexamined Patent Application, Publication No. H06-126668, each operation pattern corresponding to the processing period per workpiece is fixed, and changing or updating the operation pattern and/or the operating condition according to the feeding state of the workpiece is not considered.

Thus, there has been a need for a workpiece transfer system capable of flexibly changing or updating each operating pattern and/or the operating condition according to the feeding state of the workpiece and/or the operating state of the robot.

An aspect of the present disclosure provides a workpiece transfer system including: a workpiece infeed device configured to feed at least one workpiece; a robot configured to transfer said at least one workpiece that is fed; a workpiece outfeed device on which said at least one workpiece transferred by the robot from the workpiece infeed device is to be placed; a machine learning device configured to construct a learning model used to indicate an operating condition of the robot; and a control device configured to select the operating condition of the robot by applying a condition related to said at least one workpiece and/or a condition related to the robot to the learning model and to control the robot according to the operating condition, wherein the machine learning device includes an input data obtaining unit configured to obtain, as input data, a correspondence relation between the condition related to said at least, one workpiece and/or the condition related to the robot and the operating condition, a label obtaining unit configured to obtain, as a label, information indicating whether or not processing performance of the robot is excessive or whether or not the processing performance of the robot is insufficient, and a learning unit configured to perform supervised learning based on teaching data constituted by a set of the input data and the label to construct the learning model that is to be used to indicate the operating condition of the robot, and the control device includes a storage unit in which the learning model obtained from the machine learning device is stored, a selection unit configured to select, as the operating condition of the robot, an optimum operating condition based on the learning model, and an operation control unit configured to control operation of the robot according to the operating condition selected by the selection unit.

According to an aspect of the present disclosure, it is possible to change or update each operating pattern and/or the operating condition depending on the feeding state of the workpiece and/or the operating state of the robot.

BRIEF DESCRIPTION OF THE DRAWINGS

FIG. 5C is a view showing the flow of the updating of the operating condition table serving as the learning model in the workpiece transfer system according to the embodiment;

FIG. 6A shows an example of the operating condition table serving as the learning model in the workpiece transfer system according to the embodiment;

FIG. 6B shows an example of the operating condition table serving as the learning model in the workpiece transfer system according to the embodiment;

DETAILED DESCRIPTION OF THE INVENTION

1. First Embodiment

The following will describe a first embodiment of the present invention with reference to FIGS. 1 to 6B.

1.1 Configuration of Embodiment

Figure 1:
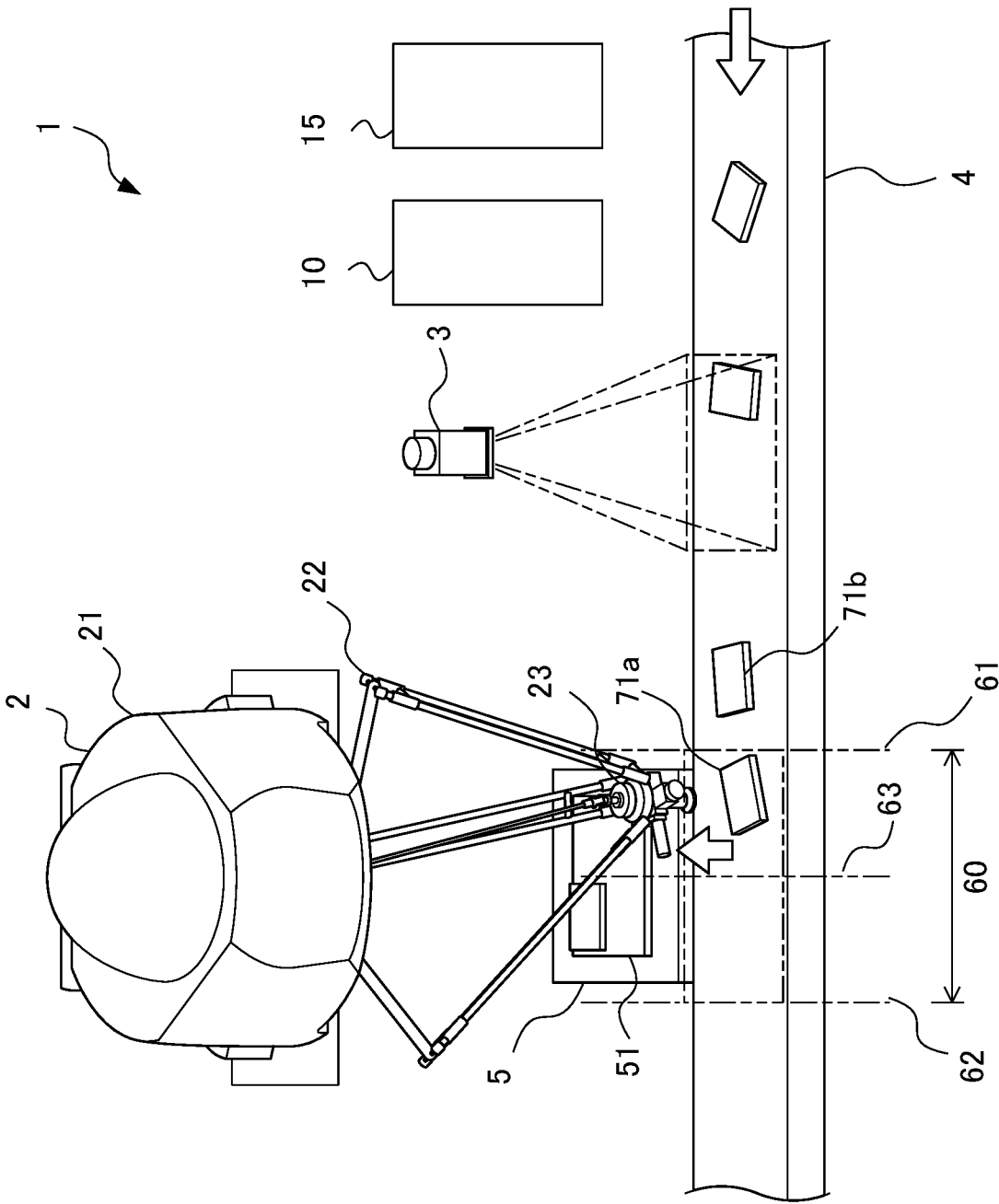
FIG. 1 is a view showing an overall configuration of a workpiece transfer system according to an embodiment.

FIG. 1 is a view showing an overall configuration of a workpiece transfer system 1 according to the first embodiment of the present invention.

As shown in FIG. 1, the workpiece transfer system 1 according to the embodiment includes a robot 2, a detection device 3, a workpiece infeed device 4, a workpiece outfeed device 5, a control device 10, and a machine learning device 15.

The robot 2 picks up a workpiece 71 fed by the workpiece infeed device 4, and places the workpiece 71 on the workpiece outfeed device 5.

The "pick-up motion" for the workpiece 71 may be performed specifically in the following manner, for example. That is, at a "pick-up position", a vacuum state is created between the workpiece 71 and a suction pad that is provided at the distal end of a hand 23 (described later) and that is connected to a vacuum generating device via a resin tube, and consequently the suction pad sticks to the workpiece 71 by suction to pick up the workpiece 71.

The "placing motion" for the workpiece 71 may be performed specifically in the following manner, for example. That is, at a "placing position", the vacuum state between the suction pad and the workpiece 71 is released by turning off the vacuum generating device, and consequently the workpiece 71 is placed.

The robot 2 includes a robot body 21, an arm 22, and the hand 23. According to a command from the robot body 21, the robot 2 drives the arm 22 to execute the pick-up motion or the placing motion for the workpiece 71 with the hand 23, which is provided to the distal end of the arm 22.

The detection device 3 detects the workpiece 71 fed by the workpiece infeed device 4. More specifically, the detection device 3 detects the number of workpieces 71, the positions and postures of the workpieces 71, and/or the like, and outputs the detection result to the control device 10.

The workpiece infeed device 4 is a device for feeding the workpieces 71 to the workpiece outfeed device 5. For example, the workpiece infeed device 4 may be constituted by a belt conveyor. In the description below, a workpiece that is to be picked up first by the robot 2 is referred to as a first workpiece 71a, and a workpiece that is to be picked up by the robot 2 next after the first workpiece is referred to as a second workpiece 71b. The first embodiment assumes that the workpieces 71 fed by the workpiece infeed device 4 are arranged substantially in a row on the conveyor and the conveyor operates at a higher peed than in a second embodiment (described later).

For the workpiece infeed device 4, an area 60 where a workpiece can be picked up (hereinafter, this area will be referred to as a workpiece pick-up possible area 60) is set. The workpiece pick-up possible area 60 has a center coinciding with a center axis of the workpiece outfeed device 5, the center axis being orthogonal to the workpiece infeed device 4. In addition, the workpiece pick-up possible area 60 is sandwiched between an upper limit line 61 and a lower limit line 62. The workpiece pick-up possible area 60 includes a miss line 63 indicating the lower limit before which the robot 2 does not miss picking up the workpiece 71.

In the first embodiment, a period of time taken for a workpiece 71 to pass through the workpiece pick-up possible area 60 is assumed to be shorter than that of a second embodiment (described later).

The workpiece outfeed device 5 is a device for discharging, to the outside of the system, the workpiece 71 picked up from the workpiece infeed device 4 and placed on the workpiece outfeed device 5 by the robot 2. For example, the workpiece outfeed device 5 may be constituted by a belt conveyor. In one example, a pallet 51 is placed on the workpiece outfeed device 5, and the robot 2 picks up the workpiece 71 from the workpiece infeed device 4 and places the workpiece 71 on the pallet 51.

Figure 2:
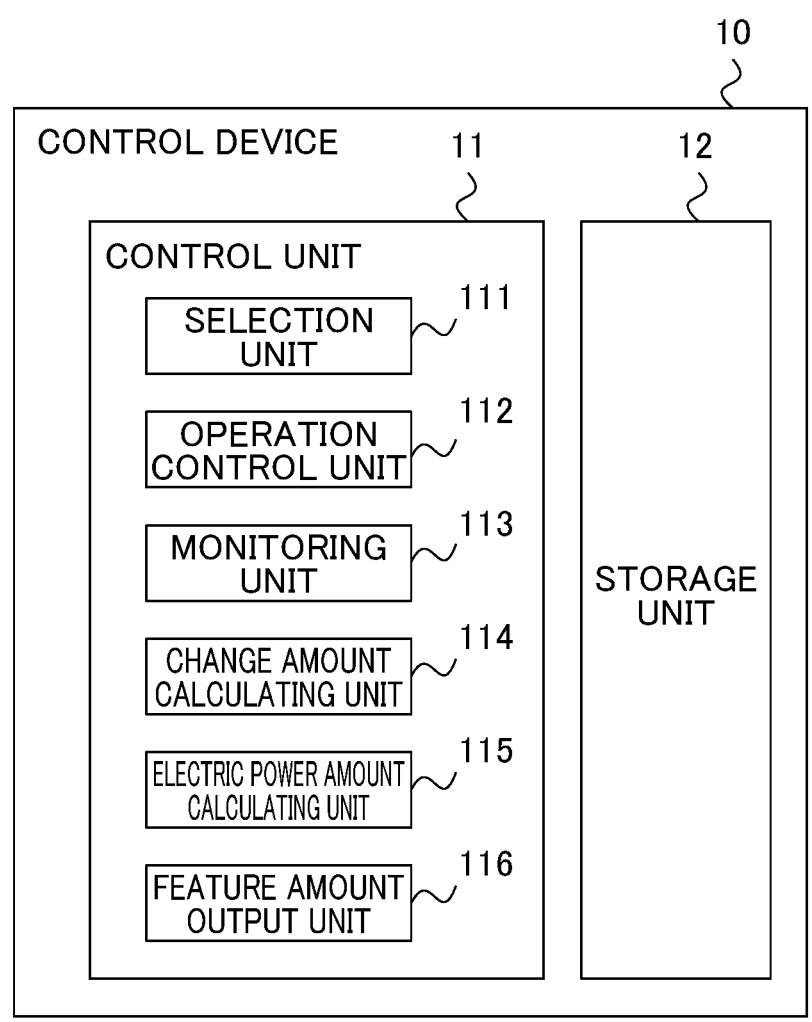
FIG. 2 is a functional block diagram of a control device included in the workpiece transfer system according to the embodiment.

The control device 10 is a device for controlling the entire workpiece transfer system 1. FIG. 2 is a block diagram showing functions of the control device 10.

The control device 10 includes a control unit 11 and a storage unit 12.

The control unit 11 controls the entire control device 10, and realizes various functions of the present embodiment by reading various programs from a storage area such as a ROM, a RAM, a flash memory or a hard disk (HDD) and executing the programs as needed. The control unit may be a CPU. The control unit 11 includes a selection unit 111, an operation control unit 112, a monitoring unit 113, a change amount calculating unit 114, an electric power amount calculating unit 115, and a feature amount output unit 116.

The selection unit 111 selects an optimum operating condition of the robot 2 by obtaining a condition related to the workpiece 71 and/or a condition related to the robot 2 from the machine learning device 15 and applying the obtained condition(s) to a learning model stored in the storage unit 12.

The condition related to the workpiece 71 includes at least one of the feeding amount of the workpiece 71 fed by the workpiece infeed device 4, the posture of the workpiece 71 that is being fed by the workpiece infeed device 4, the position in the workpiece outfeed device 5 to which position the workpiece 71 is discharged, and the posture of the workpiece 71 that is being discharged, for example.

The selection unit 111 may select the operating condition by applying a first period of time and/or a second period of time to the learning model obtained from the machine learning device 15. The first period of time is a period of time taken for the first workpiece 71a to reach, in the workpiece pick-up possible area 60, the miss line 63 indicating the lower limit before which the robot 2 does not miss picking up the first workpiece 71a. The second period of time is a period of time taken for the second workpiece 71b to reach, in the workpiece pick-up possible area 60, the miss line 63 indicating the lower limit before which the robot 2 does not miss picking up the second workpiece 71b.

With this, the selection unit 111 may select an operating condition indicating a faster operating speed for picking-up of the first workpiece 71A as the first period of time decreases. The selection unit 111 may select an operating condition indicating a faster operating speed for placing of the first workpiece 71a as the second period of time decreases. The selection unit 111 may select an operating condition indicating a faster operating speed for a pick-up motion or a placing motion for the first workpiece 71a as a difference between the first period of time and the second period of time decreases.

The condition related to the robot 2 may include at least one of the current position of the robot 2 and the posture of the robot 2.

The operation control unit 112 controls operation of the robot 2 according to the operating condition selected by the selection unit 111.

The monitoring unit 113 monitors information about the robot 2, such as the current position of the robot 2 and the posture of the robot 2. In addition, the monitoring unit 113 constantly monitors the position and posture of the workpiece 71 via the detection device 3. Particularly, the monitoring unit 113 can constantly monitor the positions and postures of the first workpiece 71*a*, which is to be picked up first out of the plural workpieces supplied by the workpiece infeed device 4, and the second workpiece 71*b*, which is to be picked up next after the first workpiece out of the plural workpieces, via the detection device 3.

The change amount calculating unit 114 calculates an amount of change of the axes of the robot 2 based on the position and posture of the workpiece 71 monitored by the monitoring unit 113.

Particularly, the change amount calculating unit 114 can calculate the amount of change of the axes of the robot 2 performing pick-up motion for the first workpiece 71*a*, based on the position and posture of the first workpiece 71*a* and the current position and posture of the robot 2. In this case, as a result of application of the amount of change to the learning model, the selection unit 111 may select an operating condition indicating a higher operating speed for the pick-up motion for the first workpiece 71*a* as the amount of change increases.

Alternatively, the change amount calculating unit 114 can calculate an amount of change of the axes of the robot 2 performing the placing motion for the first workpiece 71*a*, based on the position and posture of the first workpiece 71*a* and the position and posture of the robot 2 performing the motion for placing the first workpiece 71*a* on the workpiece outfeed device 5. In this case, as a result of application of the amount of change to the learning model, the selection unit 111 may select an operating condition indicating a higher operating speed for the placing motion for the first workpiece 71*a* as the amount of change increases.

Further alternatively, the change amount calculating unit 114 can calculate an amount of change of the axes of the robot 2 performing the pick-up motion for the second workpiece 71*b*, based on the position and posture of the robot 2 performing the motion for placing the first workpiece 71*a* on the workpiece outfeed device 5 and the position and posture of the second workpiece 71*b*. In this case, as a result of application of the amount of change to the learning model, the selection unit 111 may select an operating condition indicating a higher operating speed for the pick-up motion or placing motion for the first workpiece 71*a* as the amount of change increases.

The electric power amount calculating unit 115 calculates an amount of electric power consumed per unit period of time in a case where the workpiece transfer system 1 transfers plural workpieces 71 continuously.

The feature amount output unit 116 outputs, as a feature amount, the information related to the robot such as the current position and posture of the robot 2, the information indicating the position and posture of the workpiece 71 obtained as a result of monitoring performed by the monitoring unit 113, and the information indicating the amount of change of the axes of the robot 2 obtained as a result of a calculation performed by the change amount calculating unit 114 to the machine learning device 15, for example.

The storage unit 12 stores the learning model obtained from the machine learning device 15.

Figure 3:
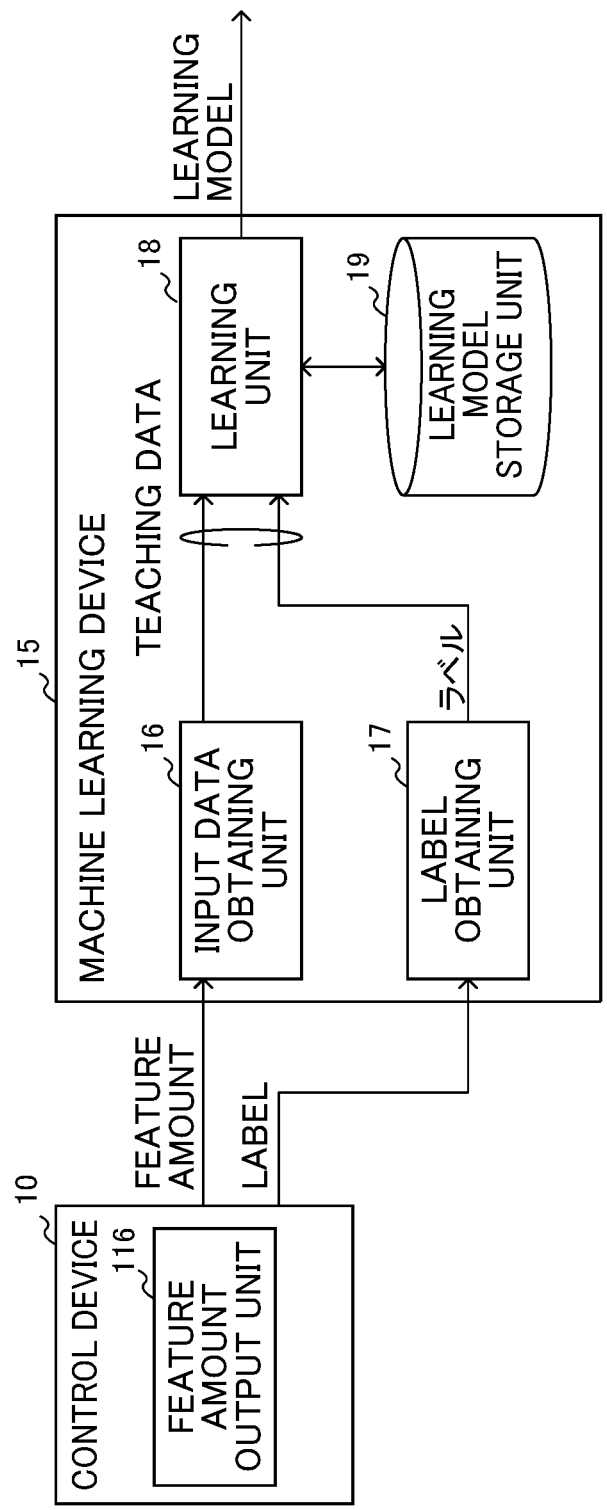
FIG. 3 is a block diagram showing details of the control device and a machine learning device included in the workpiece transfer system according to the embodiment.

FIG. 3 is a block diagram showing details of the control device 10 and the machine learning device 15 in the workpiece transfer system 1. For ease of explanation, FIG. 3 shows only the feature amount output unit 116 out of the constituent elements of the control device 10.

The machine learning device 15 performs supervised learning to construct a learning model that is to be used by the control device 10 to indicate an operating condition of the robot 2. For this purpose, as shown in FIG. 3, the machine learning device 15 includes an input data obtaining unit 16, a label obtaining unit 17, a learning unit 18, and a learning model storage unit 19.

The input data obtaining unit. 16 obtains a feature amount from the feature amount output unit 116 of the control device 10.

The label obtaining unit 17 obtains a label indicating whether or not the processing performance of the robot 2 is excessive or whether or not the processing performance of the robot 2 is insufficient.

The state in which "the processing performance of the robot 2 is insufficient" herein means a state in which the feeding amount of the workpieces 71 is excessive relative to the processing performance of the robot 2. In this state, the robot 2 may miss picking up a workpiece 71, for example.

Meanwhile, the state in which "the processing performance of the robot 2 is excessive" herein means a state where the processing performance of the robot 2 is excessive relative to the feeding amount of the workpieces 71. In this state, a standby time of the robot 2 may occur until a workpiece 71 is fed to the workpiece pick-up possible area 60, for example.

The learning unit 18 performs supervised learning based on teaching data constituted by a set of a feature amount and a label, so as to construct a learning model that is to be used by the control device 10 to indicate an operating condition of the robot 2. The learning unit 18 transmits, to the control device 10, the learning model thus constructed. The learning model storage unit 19 stores the learning model constructed by the learning unit 18.

For example, the learning unit 18 may be constituted by Support Vector Machine (hereinafter, also referred to as SVM). Since SVM is a known technique, a detailed description of SVM will not be given here. SVM is a classification technique employing supervised learning (learning based on given teaching data constituted by correct data and incorrect data), and is known as a learning model with an excellent classification function. SVM is known to exhibit a high classification performance (high generalization performance) on unlearnt data, for example.

The learning unit 18 uses, as the above-described label, a binarized label indicating whether or not the processing performance of the robot 2 is excessive or whether or not the processing performance of the robot 2 is insufficient. In addition, the learning unit 13 calculates a hyperplane in which a space including the above-described feature amounts is separated by a maximum margin based on whether or not the processing performance of the robot 2 is excessive and whether or not the processing performance of the robot 2 is insufficient. The learning unit 18 can employ the coefficient of the hyperplane as a parameter of the learning model that is to be used by the control device 10 to indicate an operating condition of the robot 2. The learning unit 18 outputs, to the control device 10, the learning model thus constructed.

As described above, the learning model storage unit 19 stores the learning model constructed by the learning unit 18.

With reference to FIGS. 4 to 6B, the following will describe one example of a learning model construction method performed by the learning unit 18.

Figure 4:
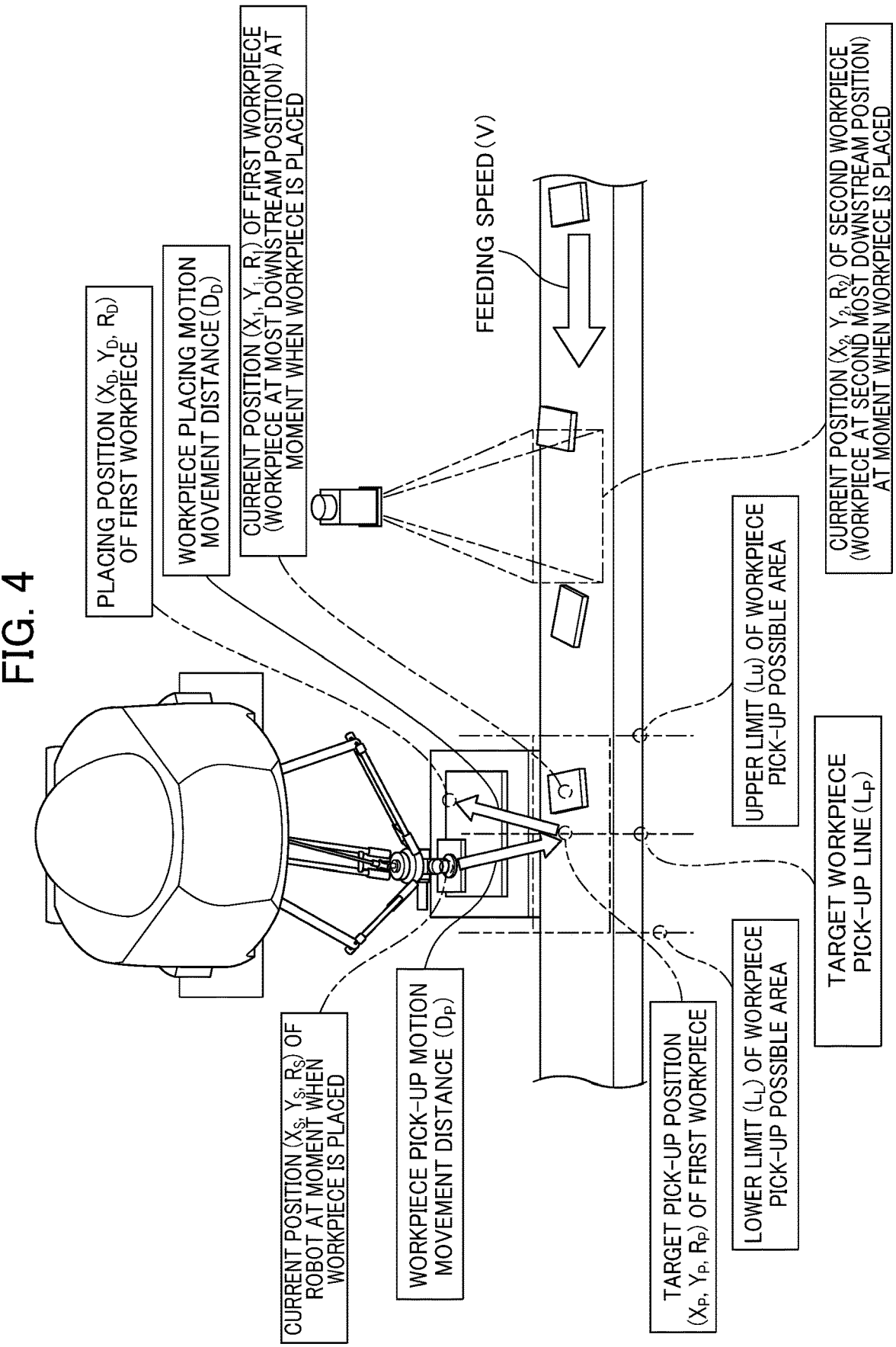
FIG. 4 is a view showing coordinate positions that are to be used to update an operating condition table serving as a learning model in the workpiece transfer system according to the embodiment.

FIG. 4 is a view showing coordinates that are to be used by the learning unit 18 to construct the learning model. A target pick-up position of the first workpiece 713 is represented by $(X_P, Y_P, R_P)$. A "workpiece pick-up motion movement distance" is a distance that the hand 23 moves to pick up the first workpiece 71a, and is represented by $D_P$. A "workpiece placing motion movement distance" is a distance that the hand 23 moves until the hand 23 places the first workpiece 71a on the pallet 51 after picking up the first workpiece 71a, and is represented by $D_D$. A "placing position" is a position to which the robot 2 places the first workpiece 71a with the hand 23, and is represented by $(X_D, Y_D, R_D)$. A current position of a workpiece (i.e., a new first workpiece) 71b that is at the most downstream position at the moment when the robot 2 places the first workpiece 71a is represented by $(X_1, Y_1, R_1)$. A current position of a workpiece (i.e., a new second workpiece) 71c that is at the second most downstream position at the moment when the robot 2 places the first workpiece 71a is represented by $(X_2, Y_2, R_2)$. A current position of the robot 2 at the moment when the robot 2 places the first workpiece 71a with the hand 23 is represented by $(X_s, Y_s, R_s)$. A position of the upper limit of the pick-up possible area for the workpiece 71 is represented by $L_U$, and a position of the lower limit of the pick-up possible area of the workpiece 71 is represented by $L_L$. A position of a target pick-up line for the workpiece 71 is represented by $L_P$. A speed at which the workpiece 71 is fed by the workpiece infeed device 4 is represented by V. More specifically, in a case where the workpiece infeed device 4 is a belt conveyor, a moving speed of the conveyor is represented by V.

Figure 5A:
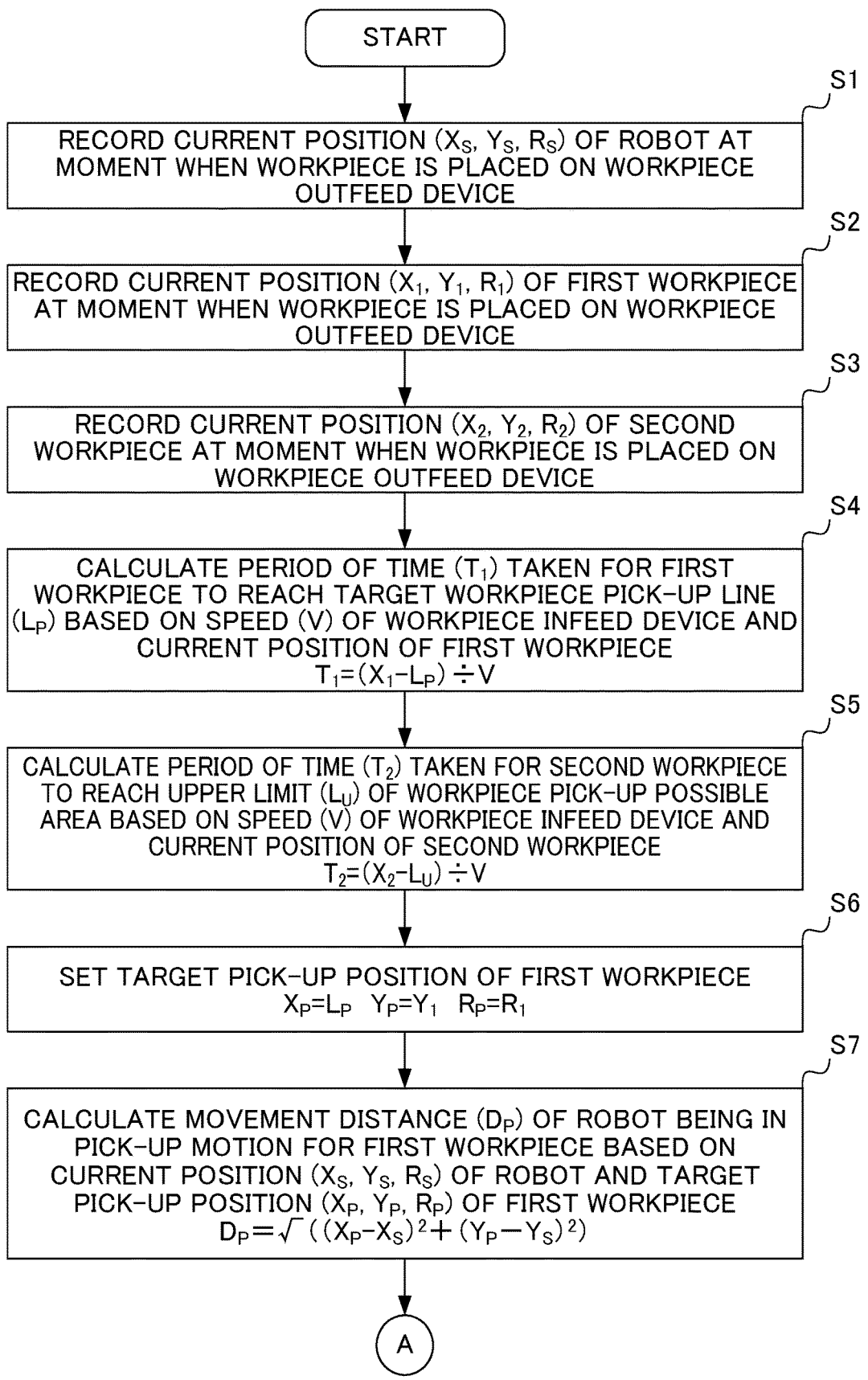
FIG. 5A is a view showing a flow of updating of the operating condition table serving as the learning model in the workpiece transfer system according to the embodiment.
Figure 5B:
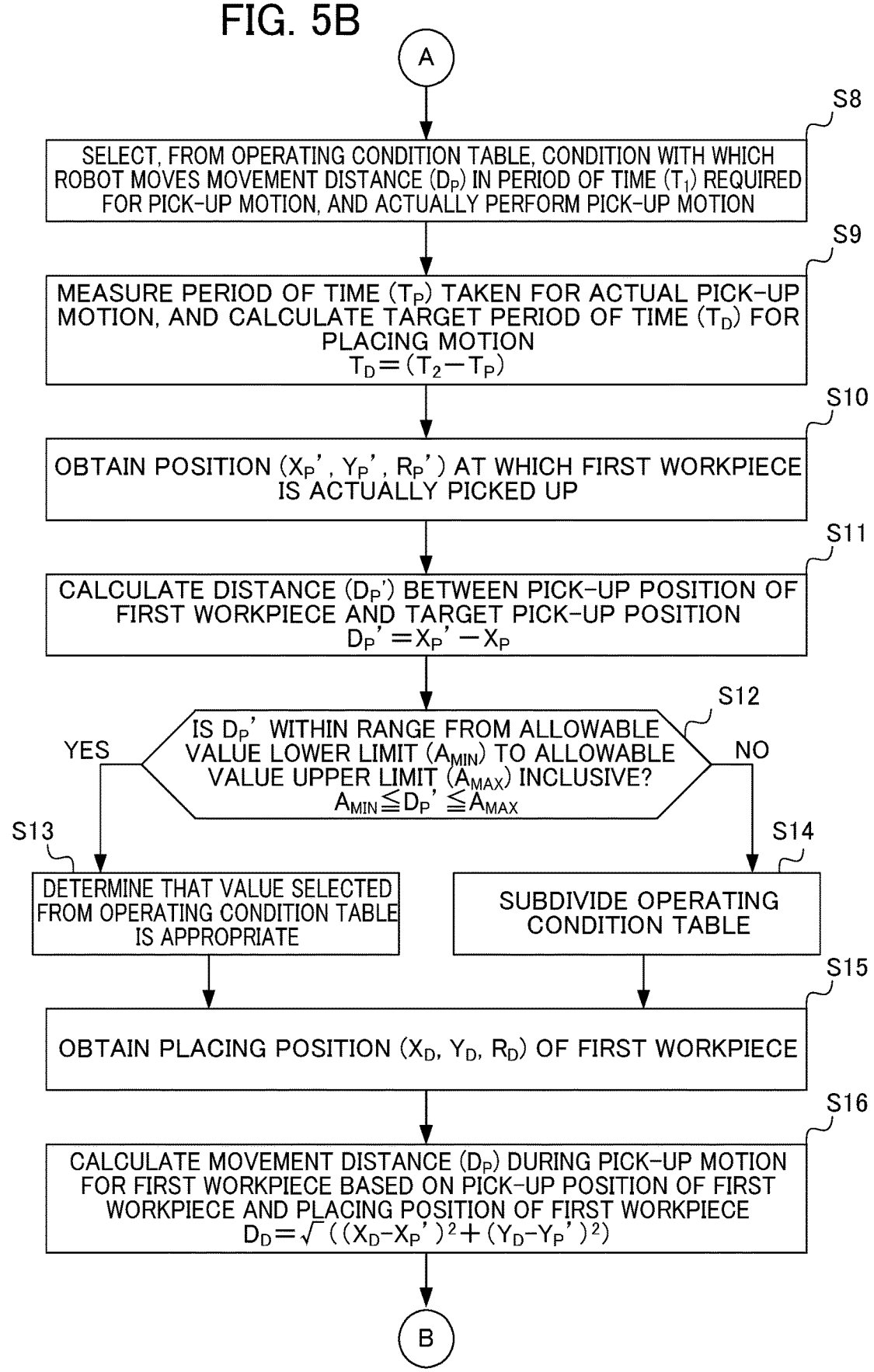
FIG. 5B is a view showing the flow of the updating of the operating condition table serving as the learning model in the workpiece transfer system according to the embodiment.

FIGS. 5A to 5C show a flowchart of one example of a method in which the workpiece transfer system 1 constructs a learning model.

In Step S1, the control unit 11 records the current position $(X_s, Y_s, R_s)$ of the robot 2 at the moment when the robot 2 places a workpiece 71 on the workpiece outfeed device 5.

In Step S2, the control unit 11 records the current position $(X_1, Y_1, R_1)$ of a new first workpiece 71b at the moment when the robot 2 places the workpiece 71 or the workpiece outfeed device 5.

In Step S3, the control unit 11 records the current position $(X_2, Y_2, R_2)$ of a new second workpiece 71c at the moment when the robot 2 places the workpiece 71 on the workpiece outfeed device 5.

In Step S4, the control unit 11 calculates a period of time $(T_1)$ taken for the first workpiece 71b to reach the target workpiece pick-up line $(L_P)$ according to the following formula (1) using the speed (V) of the workpiece infeed device 4 and the current position of the first workpiece 71b.

$$T_1 = (X_1 - L_P)/V \quad (1)$$

In Step S5, the control unit 11 calculates a period of time $(T_2)$ taken for the second workpiece 71c to reach the upper limit $(L_U)$ of the workpiece pick-up possible area 60 according to the following formula (2) using the speed (V) of the workpiece infeed device 4 and the current position of the second workpiece 71c.

$$T_2 = (X_1 - L_P)/V \quad (2)$$

In Step S6, the control unit 11 sets the target pick-up position of the first workpiece 71b according to the following formula (3).

$$X_P = L_P, Y_P = Y_1, R_P = R_1 \quad (3)$$

In Step S7, the control unit 11 calculates the movement distance $(D_P)$ of the robot 2 that is in the pick-up motion for the first workpiece 71b according to the following formula (4) using the current position $(X_s, Y_s, R_s)$ of the robot 2 and the target pick-up position $(X_P, Y_P, R_P)$ of the first workpiece 71b.

$$D_P = \sqrt{((X_P - X_s)^2 + (Y_P - Y_s)^2)} \quad (4)$$

In Step S8, the control unit 11 selects, from an operating condition table serving as the learning model, a condition with which the robot moves the movement distance $(D_P)$ in the period of time $(T_1)$ required for the pick-up motion. In addition, the robot 2 actually performs the pick-up motion.

Here, the "operating condition table" refers to a table in which operating conditions of the robot 2 are described, and is stored in the storage unit 12. FIG. 6A shows one example of the operating condition table.

In the operating condition table shown as an example in FIG. 6A, each row shows a moving speed per period of time required for a pick-up motion, whereas each column shows a moving speed per movement distance $(D_P)$. The selection unit 111 selects, from the operating condition table, a moving speed at the intersection of the period of time $(T_1)$ required for the pick-up motion and the movement distance $(D_P)$.

In Step S9, the control unit 11 measures a period of time $(T_P)$ taken for the actual pick-up motion, and calculates a target period of time $(T_D)$ for a placing motion according to the following formula (5).

$$T_D = (T_2 - T_P) \quad (5)$$

In Step 310, the control unit 11 obtains the position $(X_P', Y_P', R_P')$ at which the first workpiece 71b is actually picked up.

In Step S11, the control unit 11 calculates a distance $(D_P')$ between the pick-up position of the first workpiece 71b and the target pick-up position.

$$D_P' = X_P' - X_P \quad (6)$$

In Step S12, if $D_P'$ is within a range from an allowable value lower limit. $(A_{MIN})$ to an allowable value upper limit $(A_{MAX})$ inclusive $(A_{MIN} \leq D_P' \leq A_{MAX})$ (YES in S12), the process advances to Step S13. Meanwhile, if $D_P'$ is less than the allowable value lower limit $(A_{MIN})$ or exceeds the allowable value upper limit $(A_{MAX})$, the process advances to Step S14.

In Step S13, the control unit 11 determines that the value of the operating speed selected from the operating condition table is appropriate, and updates the learning model based on the set of the feature amount inputted by the input data obtaining unit 16 and the label indicating that the processing performance of the robot 2 is appropriate.

In Step S14, the learning unit 18 updates the learning model based on the set of the feature amount inputted by the input data obtaining unit 16 and the label indicating whether or not the processing performance of the robot 2 is excessive or whether or not the processing performance of the robot 2 is insufficient. As a result of updating of the learning model, the learning unit 18 may subdivide the operating condition table, for example.

FIG. 6B shows one example of a table obtained as a result of the subdivision of the operating condition table shown in FIG. 6A. In the table shown as an example in FIG. 6B, the column "180<$D_P$≤220" in the table shown as an example in FIG. 6A is subdivided into the column "180<$D_P$≤200" and the column "200<$D_P$≤220".

In Step S15, the control unit 11 obtains the placing position ($X_D$, $Y_D$, $R_D$) at which the first workpiece 71b is placed.

In Step S16, the control unit 11 calculates the movement distance ($D_D$) of the robot that is in the placing motion for the first workpiece 71b according to the following formula (7) using the pick-up position of the first workpiece 71b and the placing position of the first workpiece 71b.

$$D_D = \sqrt{((X_D - X_P')^2 + (Y_D - Y_P')^2)} \quad (7)$$

In Step S17, the control unit 11 selects, from the operating condition table, a condition with which the robot moves the movement distance ($D_{DP}$) in the period of time ($T_D$) taken for the placing motion. In addition, the robot 2 performs the placing motion actually.

In Step S18, upon completion of the placing motion for the first workpiece 71b, the second workpiece 71c becomes a new first workpiece. The control unit 11 obtains the current position ($X_1$, $Y_1$, $R_1$) of the first workpiece (ex-second workpiece) 71c at the time when the placing motion is completed.

In Step S19, the control unit 11 calculates a distance ($D_1$) between the first workpiece 71c and the upper limit ($L_U$) of the workpiece pick-up possible area 60 according to the following formula (8).

$$D_1 = X_1 - L_U \quad (8)$$

In Step S20, if $D_1$ is within the range from the allowable value lower limit ($A_{MIN}$) to the allowable value upper limit ($A_{MAX}$) inclusive ($A_{MIN} \leq D_1 \leq A_{MAX}$) (YES in S20), the process advances to Step S21. Meanwhile, if $D_1$ is less than the allowable value lower limit ($A_{MIN}$) or exceeds the allowable value upper limit ($A_{MAX}$), the process advances to Step S22.

In Step S21, the control unit 11 determines that the value of the operating speed selected from the operating condition table is appropriate, and updates the learning model based on the set of the feature amount inputted by the input data obtaining unit 16 and the label indicating that, the processing performance of the robot 2 is appropriate. Then, the process returns to Step S1.

In Step S22, the control unit 11 updates the learning model based on the set of the feature amount inputted by the input data obtaining unit 16 and the label indicating that the processing performance of the robot 2 is excessive or insufficient. As a result of updating of the learning model, the learning unit 18 may subdivide the operating condition table, for example. Then, the process returns to Step S1.

In the above-described configuration in which the control unit 11 is configured to select an optimum operating condition of the robot 2 from the operating condition table serving as the learning model based on the condition related to the workpiece 71 and/or the condition related to the robot 2, if a plurality of operating conditions is obtained as a result of the selection, the control unit 11 may select an operating condition giving a smaller amount of electric power consumed per unit period of time than any other ones of the plurality of operating conditions.

With the control device 10 having the above-described configuration, the workpiece transfer system 1 according to the present embodiment can not only make the robot 2 operate according to the optimum operating condition, but also change the configuration of the operating condition recorded in the storage unit 12 according to the operating state of the robot 2.

1.2 Effects of Embodiment

A workpiece transfer system 1 according to the present embodiment includes: a workpiece infeed device 4 configured to feed at least one workpiece 71; a robot 2 configured to transfer said at least one workpiece 71 that is fed; a workpiece outfeed device 5 on which said at least one workpiece 71 transferred by the robot 2 from the workpiece infeed device 4 is to be placed; a machine learning device 15 configured to construct a learning model used to indicate an operating condition of the robot 2; and a control device 10 configured to select the operating condition of the robot 2 by applying a condition related to said at least one workpiece 71 and/or a condition related to the robot 2 to the learning model and to control the robot 2 according to the operating condition, wherein the machine learning device 15 includes an input data obtaining unit 16 configured to obtain, as input data, a correspondence relation between the condition related to said at least one workpiece 71 and/or the condition related to the robot 2 and the operating condition, a label obtaining unit 17 configured to obtain, as a label, information indicating whether or not processing performance of the robot 2 is excessive or whether or not the processing performance of the robot 2 is insufficient, and a learning unit 18 configured to perform supervised learning based on teaching data constituted by a set of the input data and the label to construct the learning model that is to be used to indicate the operating condition of the robot 2, and the control device 10 includes a storage unit 12 in which the learning model obtained from the machine learning device 15 is stored, a selection unit 111 configured to select, as the operating condition of the robot 2, an optimum operating condition based on the learning model, and an operation control unit 112 configured to control operation of the robot 2 according to the operating condition selected by the selection unit 111.

With the above configuration, the robot operating condition is controlled according to the condition. This can give an effect of avoiding an acceleration/deceleration of the robot 2 that may otherwise be required by a wasteful standby state. In addition, with the above configuration, the robot 2 operates at a necessary and sufficient operating speed. This can give an effect of reducing an electric power consumption and extending the life of the speed reducer.

Furthermore, with the above configuration, it is possible to flexibly change or update the operating pattern and/or the operating condition according to the workpiece feeding state and/or the operating state of the robot.

2. Second Embodiment

Figure 7:
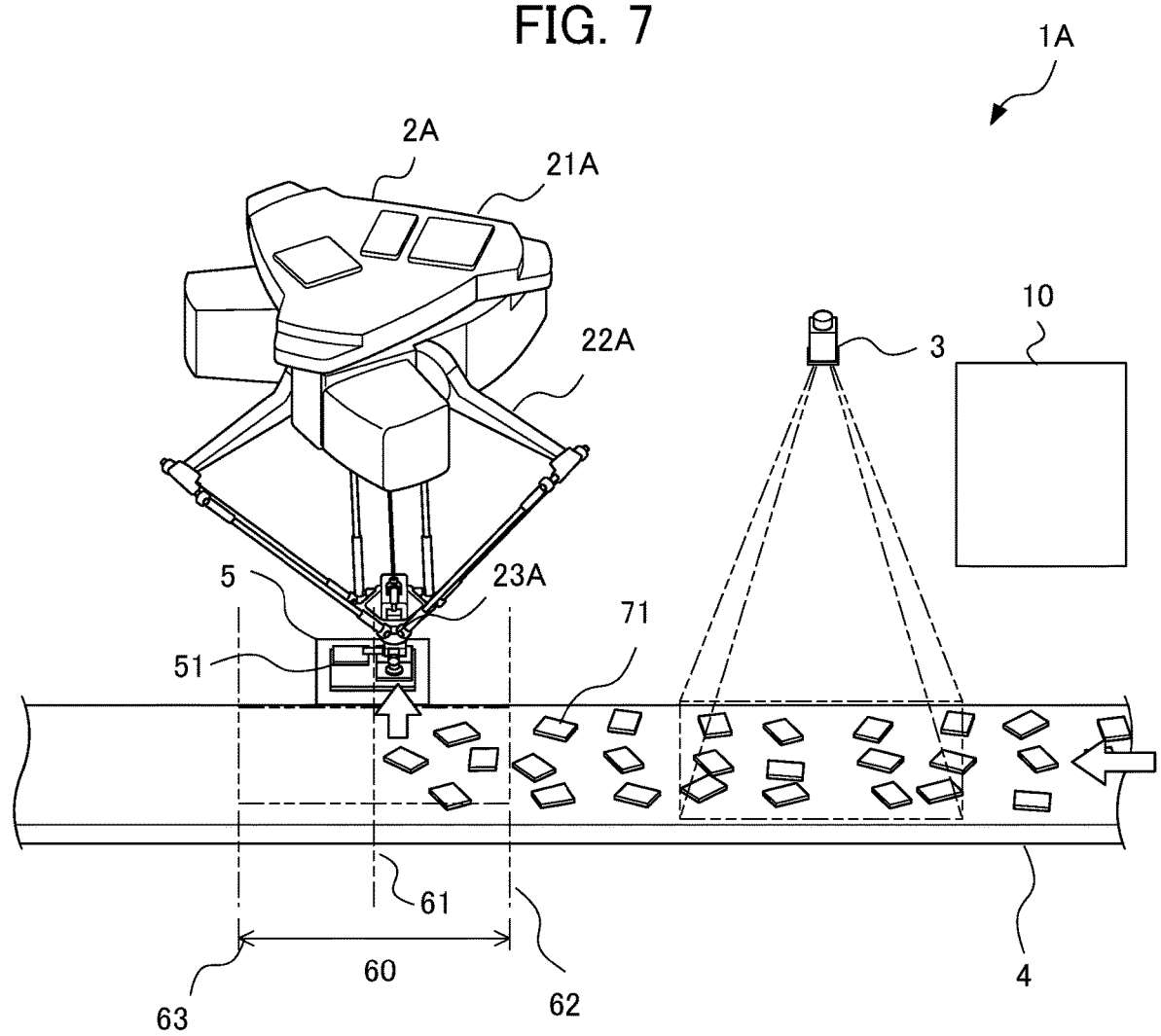
FIG. 7 is a view showing an overall configuration of a workpiece transfer system according to an embodiment.

The following will describe a second embodiment of the present invention with reference to FIG. 7. For ease of explanation, constituent elements identical to those of the first embodiment will be described with identical reference signs to those of the first embodiment, and the functions of such constituent elements will not be described here.

2.1 Configuration of Embodiment

FIG. 7 is a view showing an overall configuration of a workpiece transfer system 1A according to the second embodiment of the present invention.

According to the workpiece transfer system 1A, workpieces 71 are arranged randomly on a workpiece infeed device 4. In this point, the workpiece transfer system 1A differs from the workpiece transfer system 1, in which the workpieces 71 are arranged in a row. In order to deal with this, the workpiece transfer system 1A includes a robot 2A, which is different from the robot 2 operating in the workpiece transfer system 1. The robot 2A includes an arm 22A instead of the arm 22 and a hand 23A instead of the hand 23. In these points, the robot 2A differs from the robot 2.

The second embodiment is based on the assumption that the speed of a conveyor provided to the workpiece infeed device 4 is lower than that of the first embodiment and a period of time taken for a workpiece 71 to pass through a workpiece pick-up possible area 60 is longer than that of the first embodiment.

Figure 8:
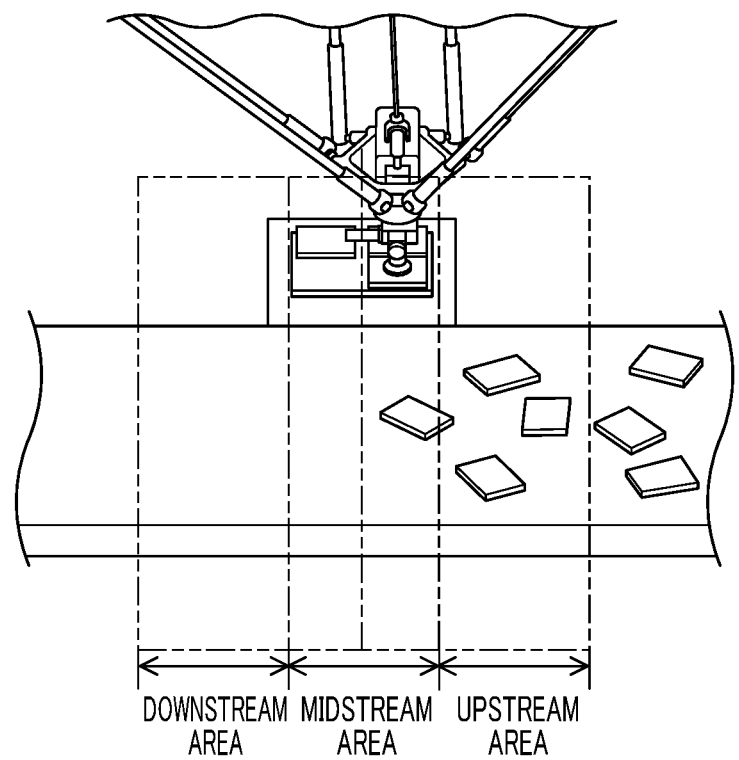
FIG. 8 is a view showing a pick-up possible area in the workpiece transfer system according to the embodiment.

FIG. 8 is a view showing a configuration of the workpiece pick-up possible area 60 according to the second embodiment. The workpiece pick-up possible area 60 includes a "midstream area" corresponding to a workpiece outfeed device 5, an "upstream area" located upstream of the midstream area, and a "downstream area" located downstream of the midstream area.

The machine learning device 15A according to the second embodiment includes a label obtaining unit 17A instead of the label obtaining unit 17. In this point, the machine learning device 15A differs from the machine learning device 15 according to the first embodiment. If the robot 2 picks up the workpieces 71 continuously from the "upstream area", the label obtaining unit 17A determines that the processing performance is excessive. If the robot 2 picks up the workpieces 71 continuously from the "midstream area", the label obtaining unit 17A determines that the processing performance is appropriate. If the robot 2 picks up the workpieces 71 continuously from the "downstream area", the label obtaining unit 17A determines that the processing performance is insufficient. The learning unit 18 constructs a learning model with use of such a label.

2.2 Effects of Embodiment

The workpiece transfer system 1A according to the present embodiment is configured as below. If the robot 2 picks up the workpiece 71 continuously from the "upstream area" in the workpiece pick-up possible area 60, the label obtaining unit 17A determines that the processing performance is excessive. If the robot 2 picks up the workpiece 71 continuously from the "midstream area" in the workpiece pick-up possible area 60, the label obtaining unit 17A determines that the processing performance is appropriate. If the robot 2 picks up the workpiece 71 continuously from the "downstream area" in the workpiece pick-up possible area 60, the label obtaining unit 17A determines that the processing performance is insufficient.

With the above configuration, particularly in a case where the speed of the conveyor of the workpiece infeed device 4 is low and the period of time taken for a workpiece 71 to pass through the workpiece pick-up possible area 60 is long, it is possible to flexibly change or update the operating pattern and/or the operating condition according to the feeding state of the workpiece 71 and/or the operating state of the robot 2.

The foregoing has explained the embodiments of the present invention. However, the present invention is not limited to these embodiments. The effects of the present embodiments described herein are most suitable effects that, can be achieved by the present invention. However, the effects of the present invention are not limited to the effects of the present embodiments described herein.

EXPLANATION OF REFERENCE NUMERALS 1, 1A workpiece transfer system
2, 2A robot
4 workpiece infeed device
5 workpiece outfeed device
10, 10A control device
11 control unit
12 storage unit
15, 15A machine learning device
16 input data obtaining unit
17, 17A label obtaining unit
18 learning unit
19 learning model storage unit
60 workpiece pick-up possible area
71 workpiece
111 selection unit
112 operation control unit
113 monitoring unit
114 change amount calculating unit
115 electric power amount calculating unit
116 feature amount output unit

What is claimed is:

1. A workpiece transfer system comprising: a workpiece infeed device configured to feed at least one workpiece;
a robot configured to transfer said at least one workpiece that is fed;
a workpiece outfeed device on which said at least one workpiece transferred by the robot from the workpiece infeed device is to be placed;
a machine learning device configured to construct a learning model used to indicate an operating condition of the robot; and
a control device configured to select the operating condition of the robot by applying a condition related to said at least one workpiece and/or a condition related to the robot to the learning model and to control the robot according to the operating condition, wherein
the machine learning device includes
an input data obtaining unit configured to obtain, as input data, a correspondence relation between the condition related to said at least one workpiece and/or the condition related to the robot and the operating condition,
a label obtaining unit configured to obtain, as a label, information indicating whether or not processing performance of the robot is excessive or whether or not the processing performance of the robot is insufficient, and
a learning unit configured to perform supervised learning based on teaching data constituted by a set of the input data and the label to construct the learning model that is to be used to indicate the operating condition of the robot, and
the control device includes
a storage unit in which the learning model obtained from the machine learning device is stored,
a selection unit configured to select, as the operating condition of the robot, an optimum operating condition based on the learning model, and
an operation control unit configured to control operation of the robot according to the operating condition selected by the selection unit.

2. The workpiece transfer system according to claim 1, wherein the condition related to said at least one workpiece is a condition related to at least one of a feeding amount of said at least one workpiece, a posture of said at least one workpiece that is being fed, a position in the workpiece outfeed device to which position said at least one workpiece is discharged, and a posture of said at least one workpiece that is being discharged.

3. The workpiece transfer system according to claim 1, wherein the condition related to the robot is a condition related to at least one of a current position of the robot and a posture of the robot.

4. The workpiece transfer system according to claim 1, wherein the control device further includes
a monitoring unit configured to constantly monitor a position and a posture of a first workpiece that is to be picked up first out of plural workpieces fed by the workpiece infeed device and a position and a posture of a second workpiece that is to be picked up next after the first workpiece out of the plural workpieces, wherein
the selection unit is further configured to select the operating condition by applying a first period of time and/or a second period of time to the learning model, the first period of time being a period of time taken for the first workpiece to reach, in a workpiece pick-up possible area set in the workpiece infeed device, a lower limit line before which the robot does not miss picking up the first workpiece, the second period of time being a period of time taken for the second workpiece to reach, in the workpiece pick-up possible area, the lower limit line before which the robot does not miss picking up the second workpiece.

5. The workpiece transfer system according to claim 4, wherein the selection unit is further configured to select, as the operating condition, an operating condition indicating a faster speed for picking-up of the first workpiece as the first period of time decreases, the selection unit is further configured to select, as the operating condition, an operating condition indicating a faster speed for placing of the first workpiece as the second period of time decreases, and the selection unit is further configured to select, as the operating condition, an operating condition indicating a faster speed for a pick-up motion or a placing motion for the first workpiece as a difference between the first period of time and the second period of time decreases.

6. The workpiece transfer system according to claim 1, wherein the control device further includes
a monitoring unit configured to constantly monitor a position and a posture of said at least one workpiece, and
a change amount calculating unit configured to calculate an amount of change of axes of the robot based on the position and posture of said at least one workpiece monitored by the monitoring unit, and
the selection unit is further configured to select the operating condition by applying the amount of change to the learning model.

7. The workpiece transfer system according to claim 6, wherein the monitoring unit is further configured to constantly monitor a position and a posture of a first workpiece that is to be picked up first out of plural workpieces fed by the workpiece infeed device,
the change amount calculating unit is further configured to calculate an amount of change of the axes of the robot performing a pick-up motion for the first workpiece, based on a position and a posture of the first workpiece and a current position and a posture of the robot, and
the selection unit is further configured to select the operating condition by applying the amount of change to the learning model.

8. The workpiece transfer system according to claim 7, wherein the selection unit is further configured to select, as the operating condition, an operating condition indicating a higher operating speed for the pick-up motion for the first workpiece as the amount of change increases.

9. The workpiece transfer system according to claim 6, wherein the monitoring unit is further configured to constantly monitor the position and posture of the first workpiece that is to be picked up first out of plural workpieces fed by the workpiece infeed device,
the change amount calculating unit is further configured to calculate an amount of change of the axes of the robot performing a placing motion for the first, workpiece, based on the position and posture of the first workpiece and a position and a posture of the robot performing a motion for placing the first workpiece on the workpiece outfeed device, and
the selection unit is further configured to select the operating condition by applying the amount of change to the learning model.

10. The workpiece transfer system according to claim 8, wherein the selection unit is further configured to select, as the operating condition, an operating condition indicating a higher operating speed for the placing motion for the first workpiece as the amount of change increases.

11. The workpiece transfer system according to claim 7, wherein the monitoring unit is further configured to constantly monitor a position and a posture of a second workpiece that is to be picked up next after the first workpiece out of the plural workpieces fed by the workpiece infeed device,
the change amount calculating unit is further configured to calculate an amount of change of the axes of the robot performing a pick-up motion for the second workpiece, based on a position and a posture of the robot performing a motion for placing the first workpiece on the workpiece outfeed device and the position and posture of the second workpiece, and
the selection unit is further configured to select the operating condition by applying the amount of change to the learning model.

12. The workpiece transfer system according to claim 11, wherein the selection unit is further configured to select, as the operating condition, an operating condition indicating a higher operating speed for the pick-up motion or the placing motion for the first workpiece as the amount of change increases.

13. The workpiece transfer system according to claim 1, wherein said at least one workpiece comprises plural workpieces,
in a case where the robot picks up the plural workpieces continuously from an upstream area in a workpiece pick-up possible area set in the workpiece infeed device, the label obtaining unit determines that the processing performance is excessive,
in a case where the robot picks up the plural workpieces continuously from a midstream area in the workpiece pick-up possible area, the label obtaining unit determines that the processing performance is appropriate, and
in a case where the robot picks up the plural workpieces continuously from a downstream area in the workpiece pick-up possible area, the label obtaining unit determines that the processing performance is insufficient.

14. The workpiece transfer system according to claim 1, wherein, in a case where a standby time of the robot occurs until said at least one workpiece is fed to a workpiece pick-up possible area set in the workpiece infeed device, the label obtaining unit determines that the processing performance is excessive.

15. The workpiece transfer system according to claim 1, wherein, in a case where the robot misses picking up said at least one workpiece, the label obtaining unit determines that the processing performance is insufficient.

16. The workpiece transfer system according to claim 1, wherein the control device further includes
- an electric power amount calculating unit configured to calculate an amount of electric power consumed per unit period of time in a case where workpieces are transferred continuously, and
- the selection unit is further configured to select, in a case where plural operating conditions are obtained as a result of the selection of the optimum operating condition, an operating condition giving a smaller amount of electric power consumed per unit period of time than any other ones of the plural operating conditions.

\* \* \* \* \*